(12) United States Patent
Beyerlein et al.

(10) Patent No.: US 10,851,812 B2
(45) Date of Patent: Dec. 1, 2020

(54) ROTARY DRIVE DEVICE AND A ROBOT ARM OF A ROBOT EQUIPPED THEREWITH

(71) Applicant: Festo SE & Co. KG, Esslingen (DE)

(72) Inventors: Thomas Beyerlein, Stuttgart (DE); Bernd Bellingrodt, Rechberghausen (DE)

(73) Assignee: FESTO SE & CO. KG, Esslingen (DE)

( * ) Notice: Subject to any disclaimer, the term of this patent is extended or adjusted under 35 U.S.C. 154(b) by 0 days.

(21) Appl. No.: 16/367,843

(22) Filed: Mar. 28, 2019

(65) Prior Publication Data

US 2019/0316609 A1 Oct. 17, 2019

(30) Foreign Application Priority Data

Apr. 13, 2018 (DE) .......................... 10 2018 205 638

(51) Int. Cl.

| F15B 15/12 | (2006.01) |
|---|---|
| F15B 11/10 | (2006.01) |
| F15B 13/044 | (2006.01) |
| B25J 9/14 | (2006.01) |

(Continued)

(52) U.S. Cl.
CPC .............. *F15B 15/12* (2013.01); *B25J 9/146* (2013.01); *F15B 11/10* (2013.01); *F15B 13/044* (2013.01); *F15B 13/086* (2013.01); *F15B 2013/004* (2013.01); *F15B 2211/526* (2013.01); *F15B 2211/6313* (2013.01); *F15B 2211/6653* (2013.01); *F15B 2211/7058* (2013.01); *F15B 2211/7656* (2013.01)

(58) Field of Classification Search
CPC .. F15B 11/006; F15B 11/10; F15B 2013/002; F15B 2013/004; F15B 13/086; F15B 15/12
See application file for complete search history.

(56) References Cited

U.S. PATENT DOCUMENTS

| 5,622,096 | A | * | 4/1997 | Granberg | ............. | G01D 11/245 |
| | | | | | | 92/120 |
| 9,528,617 | B2 | * | 12/2016 | Maichl | ................ | F15B 13/0803 |
| 9,857,806 | B2 | * | 1/2018 | Maichl | ................ | F15B 13/0857 |

(Continued)

FOREIGN PATENT DOCUMENTS

| DE | 3941255 A1 | 6/1991 |
| DE | 4031185 A1 | 4/1992 |

(Continued)

*Primary Examiner* — Michael Leslie
(74) *Attorney, Agent, or Firm* — Hoffmann & Baron, LLP

(57) ABSTRACT

A rotary drive device has a fluid-actuated rotary drive which has a drive housing and a drive unit rotatable about a main axis relative to the drive housing. The drive unit contains a pivot piston which divides two drive chambers from one another in the interior of the drive housing, which can be supplied with compressed air fluidic pressure medium controlled by a control fluid channel system, in order to cause a rotational movement of the drive unit. The rotary drive is equipped with a pressure detecting device, which enables pressure detection of the fluid pressure prevailing in the two drive chambers by means of pressure detecting channels formed separately with respect to the control fluid channel system. A robot arm is also proposed, which includes the rotary drive device as an arm joint.

20 Claims, 7 Drawing Sheets

(51) Int. Cl.
   *F15B 13/08*   (2006.01)
   *F15B 13/00*   (2006.01)

(56) References Cited

U.S. PATENT DOCUMENTS

| | | | | |
|---|---|---|---|---|
| 9,897,114 | B2* | 2/2018 | Baasch | F15B 15/12 |
| 9,976,577 | B2* | 5/2018 | Ryu | F15B 15/12 |
| 2018/0194000 | A1* | 7/2018 | Smith | A61F 2/64 |
| 2019/0314981 | A1* | 10/2019 | Markowski | F15B 15/12 |
| 2019/0316604 | A1* | 10/2019 | Markowski | F15B 15/2815 |
| 2019/0316605 | A1* | 10/2019 | Beger | F15B 11/10 |

FOREIGN PATENT DOCUMENTS

| | | |
|---|---|---|
| DE | 202008003944 U1 | 7/2008 |
| DE | 102009032897 A1 | 1/2011 |
| DE | 102010013617 A1 | 10/2011 |

\* cited by examiner

ROTARY DRIVE DEVICE AND A ROBOT ARM OF A ROBOT EQUIPPED THEREWITH

BACKGROUND OF THE INVENTION

The invention relates to a rotary drive device comprising a fluid-actuated rotary drive, which has a drive housing and a drive unit rotatable relative thereto about a main axis of the rotary drive by a controlled fluid application of at least one pivot piston arranged in the drive housing, whereby a drive shaft of the drive unit connected to the pivot piston projects from the drive housing at an axial front side of drive housing with a drive section enabling a force output, and with a control valve arrangement comprising at least one electrically actuatable control valve, which is fluidically connected via a control fluid channel system to two drive chambers of the rotary drive separated from one another by the pivot piston in the drive housing, and which is designed to control the fluid pressurization of the two drive chambers for rotation and rotative positioning of the drive unit relative to the drive housing.

The invention further relates to a robot arm of a robot which has at least two arm members which are connected with one another in a pivotable manner relative to one another by means of an arm joint.

A rotary drive device designed in the aforementioned manner is known from DE 20 2008 003 944 U1. It comprises a fluid-operated rotary drive, which has a drive housing and a drive unit rotatable relative to the drive housing. The drive unit comprises a drive shaft projecting from the front of the drive housing and two pivot pistons non-rotatably connected to the drive shaft in the interior of the drive housing, each dividing two drive chambers from one another. The drive chambers are connected to a control valve arrangement and can through their actuation be supplied with compressed air, and thereby controlled, such that rotational movement of the drive unit relative to the drive housing can be brought about.

From DE 39 41 255 C2, a rotary drive device is also known in which the drive shaft of the fluid-operated rotary drive is however combined with only a single pivot piston to form a drive unit.

DE 10 2010 013 617 B4 discloses a robot of a modular design, which has a movable robot arm which is equipped with at least one arm joint interconnecting two arm members which are movable relative to one another. The arm joint is formed by a rotary drive device comprising an electrically actuatable rotary drive.

SUMMARY OF THE INVENTION

The invention has for its object to provide a rotary drive device which allows a very precise rotative positioning of the drive unit and which is particularly suitable for the realisation of at least one robot arm having an arm joint.

To solve this problem it is provided in a rotary drive device in conjunction with the above-mentioned features, that a pressure detecting device is arranged on the fluid-actuated rotary drive, by which the fluid pressure prevailing in the drive chambers can be detected via pressure detecting channels opening into the two drive chambers and designed separately with respect to the control fluid channel system, for enabling a pressure-regulated operating mode of the fluid-operated rotary drive.

A robot arm of a robot according to the invention comprises at least one arm joint connecting two arm members in a pivotable manner relative to one another, which is formed by a rotary drive device designed in the aforementioned manner, whereby the drive section of the drive shaft and the drive housing of the fluid-operated rotary drive each have a mounting interface for mounting one of the arm members of the robot arm.

According to the invention, the fluid-actuated rotary drive is equipped with a pressure detecting device, which offers the possibility of detecting the fluid pressure prevailing in the two drive chambers separately from one another. With the help of such pressure detection, a pressure-controlled operating mode of the fluid-operated rotary drive is possible, whereby the rotational movement and the rotational positions realisable by the rotational movement can be predetermined based on the fluid pressure building up in the drive chamber. Depending on whether a pressure difference is set in favour of the first or the second drive chamber, the drive device rotates in one or the other direction, whereby the speed of rotation can be influenced by the extent of the pressure difference. To specify a specific rotational position of the drive unit, an identical fluid pressure can be set in the two drive chambers, which can be verified and monitored by means of the pressure detecting device. The aeration and deaeration of the drive chambers taking place for the purpose of changing the pressure conditions takes place through the control fluid channel system, via which the drive chambers communicate with a control valve arrangement having at least one electrically actuatable control valve. The control fluid channel system opens into each of the two drive chambers with a working channel. The pressure detecting device operates particularly precisely because the pressure pickup in the drive chambers does not take place via the control fluid channel system, but via separate pressure detecting channels, which open into one of the drive chambers independently of the control fluid channel system and its working channels. Short-term pressure fluctuations, which occur in particular in a transition between an aeration state and a deaeration state in the working channels, thus have no effect or at least only a minimal effect on the detected fluid pressure, so that the drive unit is rotatable and rotatively positionable with high accuracy.

Advantageous further developments of the invention are described in the dependent claims.

The drive chambers are expediently bounded radially on the outside by a peripheral side wall of the drive housing, whereby the pressure detecting channels pass through this peripheral side wall, in particular in a radial direction with respect to the main axis. Each pressure detection channel opens at the radial inner circumferential surface of the peripheral side wall facing the main axis in one of the drive chambers.

The pressure detecting device is preferably arranged on the outer circumferential surface of the peripheral side wall of the drive housing facing radially away from the main axis. The pressure detecting device thus sits directly on the drive housing with a particularly small distance from the drive chambers.

The pressure detecting device expediently contains, for each drive chamber, its own pressure sensor, which is connected to the pressure detection channel opening into the relevant drive chamber. Preferably, each pressure sensor is inserted or plugged from the outside of the drive housing into the associated pressure detection channel, for which purpose it preferably has a pressure pickup connection piece axially immersed in the pressure-detection channel.

The pressure detecting channels preferably open into the drive chambers with inner channel entrances such that these inner channel entrances lie outside a pivoting range that can be traversed by a wing section of the pivot piston when the pivot piston executes a pivoting movement that causes the drive unit to rotate.

The inner channel entrances of the pressure detecting channels are arranged in particular on this side and the other side in the vicinity of a partition wall element which, together with the pivot piston, subdivides a housing interior formed in the drive housing into the two drive chambers in a circular contour.

The partition wall element is in particular designed such that it acts as a stop element for specifying a maximum pivot angle of the rotating piston through interaction with the wing section of the pivot piston. The inner channel entrances of the pressure detecting channels are arranged adjacent to the partition wall element in regions of the drive chambers, which are outside of the pivoting range of the wing section defined by the maximum pivot angle of the pivot piston. This ensures that each pressure detection channel always communicates with one and the same drive chamber in each pivoting position of the pivot piston.

The control fluid channel system expediently opens into each drive chamber with an inner channel entrance of a working channel, whereby these inner channel entrances are each arranged on one of two end walls axially delimiting the drive chambers of the drive housing of the rotary drive, in particular on the same axial end wall.

It is advantageous if the pressure detecting device is arranged on a sensor holder mounted radially on the outside of the drive housing. The pressure detecting device is combined expediently with this sensor holder to form an assembly that can be handled as a single unit during assembly of the rotary drive device.

In an advantageous embodiment of the rotary drive device, an electronic control unit electrically connected with the control valve arrangement for its electric control is arranged on the rotary drive and is equipped with a pressure regulation unit processing the fluid pressures detected in the drive chambers for rotational position control of the drive unit.

The electronic control unit is expediently attached to the drive housing of the rotary drive and is thereby combined with the rotary drive to form a drive assembly that can be handled as a single unit. Each electrically actuatable control valve of the control valve arrangement receives the electrical control signals predetermining the operating state from the electronic control unit, in particular controlled by the pressure regulation unit integrated into the electronic control unit.

The at least one electrically actuatable control valve, in particular in the case of each control valve of the control valve arrangement, is preferably an electrically controllable piezoelectric valve. In particular, each piezoelectric valve has at least one bending transducer as a control element which controls the fluid flow to and from the drive chambers. One and the same piezoelectric valve can have only one single control element or also a plurality of control elements, whereby the latter offer the possibility of either controlling high flow rates in parallel actuation or else of using each control element for controlling one of the two drive chambers.

Each piezoelectric valve equipped with a bending transducer expediently has a longitudinal shape and is preferably placed in the region of the outer circumference of the drive housing such that the longitudinal axes of all the existing piezoelectric valves are aligned parallel to the main axis of the rotary drive.

The use of piezoelectric valves as control valves allows in a particularly advantageous manner a proportional fluid control behaviour in the pressure-controlled fluid admission flow of the drive chambers. In this case, the free flow cross-section made available to the drive fluid used for flowing through, in particular compressed air, can be adjusted very easily by continuous variation of the drive voltage.

As an alternative to a piezoelectric type, the control valve arrangement can also be of an electromagnetic type. Mixed forms of these two types are also possible.

In particular, if at least one electrically actuatable control valve of the control valve arrangement is designed as a piezoelectric valve, it is advantageous if the electronic control unit has a high-voltage stage which is designed to provide the high-voltage drive voltage required for the actuation of the control valve arrangement. The high-voltage stage is thus preferably also a component of the aforementioned drive assembly.

It is advantageous if the rotary drive device contains, as a further component, an encoder designed to detect the rotation angle of the drive unit, which is expediently arranged on the axial rear side of the drive housing of the rotary drive. The encoder provides rotational position signals with respect to the rotational position of the drive unit, which can be used as the basis for the rotational angular positioning of the drive unit with respect to the drive housing of the rotary drive. The encoder is expediently connected to the abovementioned electronic control unit, which is designed in this case to evaluate and process the encoder signals.

The encoder preferably comprises a movable encoder unit, which is arranged non-rotatably on a detection section of the drive shaft projecting on the axial rear side of the drive housing and which participates in the rotational movement of the drive shaft. It further includes a contactless encoder unit fixedly mounted on the drive housing, cooperating with the movable encoder unit, whereby it is the fixed encoder unit which is electrically connected to the electronic control unit.

It is particularly advantageous if the rotary drive device has a pneumatic connection unit attached to the drive housing, which in externally accessible manner has an aeration connection which is connectable or connected to an external pressure source, in particular a compressed air source, and a deaeration connection which is connectable or connected to a pressure sink. The control valve arrangement is connected via an aeration channel with the aeration connection and also via a deaeration channel with the deaeration connection. Thus, the supply and discharge of the pressure medium necessary for the actuation of the rotary drive, in particular formed by compressed air, can take place through the pneumatic connection unit. The term "pneumatic" in the pneumatic connection unit is to be understood as representative of use with any type of pressurised fluid and is not limited to compressed air.

The aeration connection and/or the deaeration connection expediently have a plug connection device for releasably connecting a fluid hose which establishes the connection to the pressure source and to the pressure sink.

Preferably, the pneumatic connection unit is equipped with a further pressure detecting device which is able to detect the fluid pressure present at the aeration connection and/or at the deaeration connection. This opens up diagnostic options, for example, to monitor whether the aeration connection is present at a sufficiently high supply pressure and/or whether the discharged compressed air can flow without backflow.

The electronic control unit is preferably equipped with an electromechanical interface device, which allows the connection of, in particular, a serial bus system connected with a superordinate electronic control device. This electronic control device is preferably arranged away from the rotary drive device. It is able to coordinate the actuation of the fluid-operated rotary drive with other devices, for example with one or more other fluid-operated rotary drives. In the latter case, it is particularly advantageous if a plurality of rotary drive devices are integrated as arm joints in a robot arm of a robot.

The rotary drive device can be operated in particular with any serial bus system, for example with a so-called "CAN Bus" or with a so-called Ethernet.

The control valve arrangement is expediently attached to the drive housing and thus, together with the rotary drive, forms a drive assembly that can be handled as a single unit.

The control valve arrangement is preferably attached to the drive housing via a valve carrier device carrying it. This allows a particularly variable positioning of the control valve arrangement on the drive housing. In addition, there is the advantageous possibility for realising the control fluid channel system at least partially in the valve carrier device, so that the channel arrangement within the drive housing can be kept very simple.

The valve carrier device is preferably mounted on the axial rear side on the drive housing of the rotary drive. The valve carrier device is preferably mounted on the axial rear side on the drive housing of the rotary drive.

The control fluid channel system which establishes the connection between the drive chambers and the control valve arrangement is preferably formed in its entirety without the use of hoselines and pipelines inside the components of the rotary drive device. This results in particularly compact dimensions while avoiding damage to the control fluid channel system by external mechanical influences.

A robot arm according to the invention is expediently a component of a robot and is equipped with a sufficient number of arm joints, which in each case connect two arm members of the robot arm in a pivotable manner Each arm joint is formed by a rotary drive device of the type mentioned above in various manifestations, such that the articulated arm members are pivotably positionable relative to one another and are angularly positionable relative to one another in an application-specific manner At the free end of the robot arm sits an end effector positionable by actuation of the robot arm, for example, a gripping device actuatable electrically or by fluid force. Both on the drive section of the drive unit and on the drive housing of the rotary drive is a mounting interface for attachment of one of the arm members connected in an articulated manner by an arm joint. The driving force for pivoting the articulated arm members is a fluid force provided by the fluidic pressure medium, in particular compressed air, used to actuate the fluid actuated rotary drive.

BRIEF DESCRIPTION OF THE DRAWINGS

The invention is explained in more detail below with reference to the attached drawing, in which.

DETAILED DESCRIPTION

Figure 1:
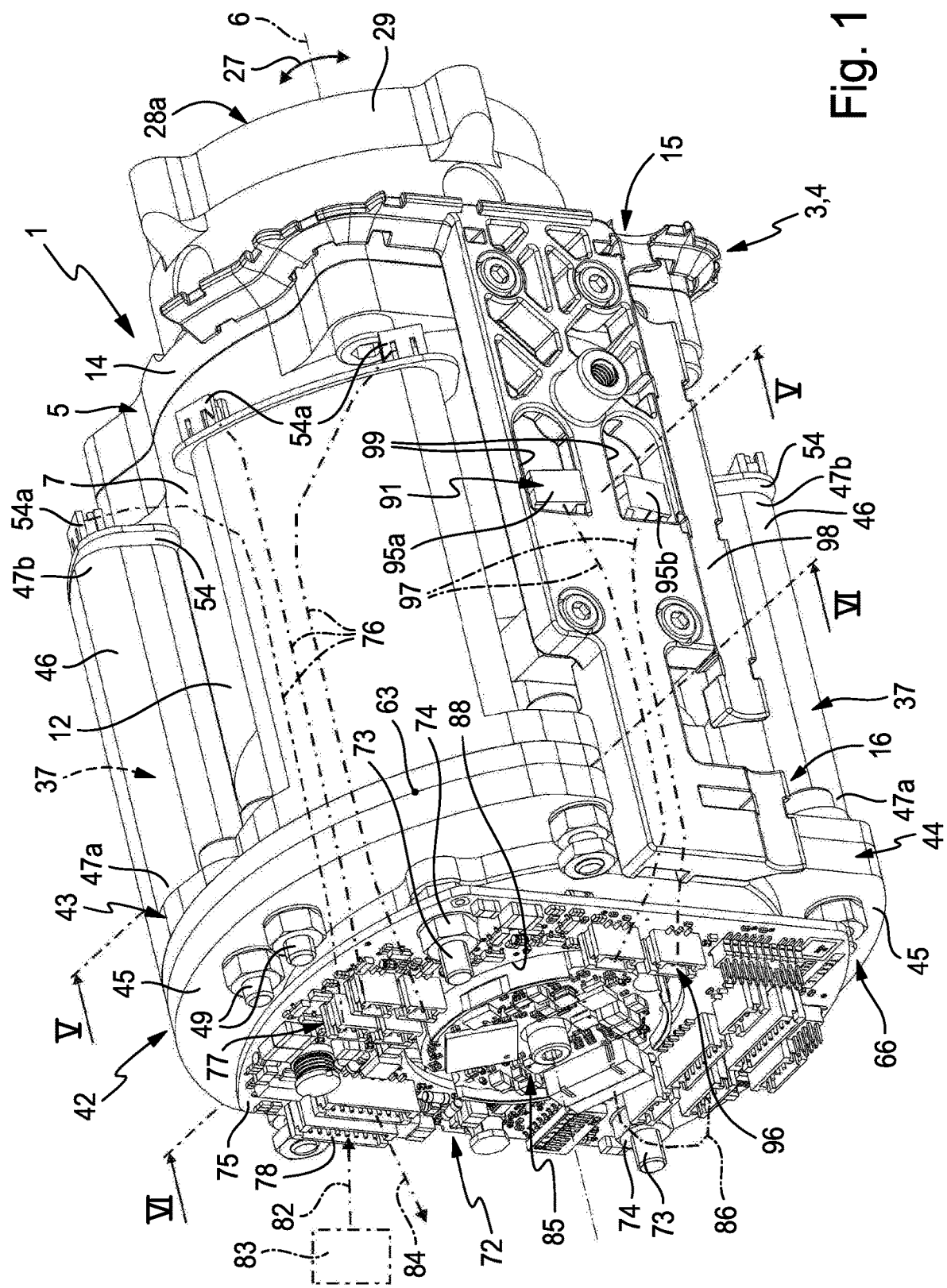
FIG. 1 shows a preferred embodiment of the rotary drive device according to the invention in a perspective rear view.
Figure 2:
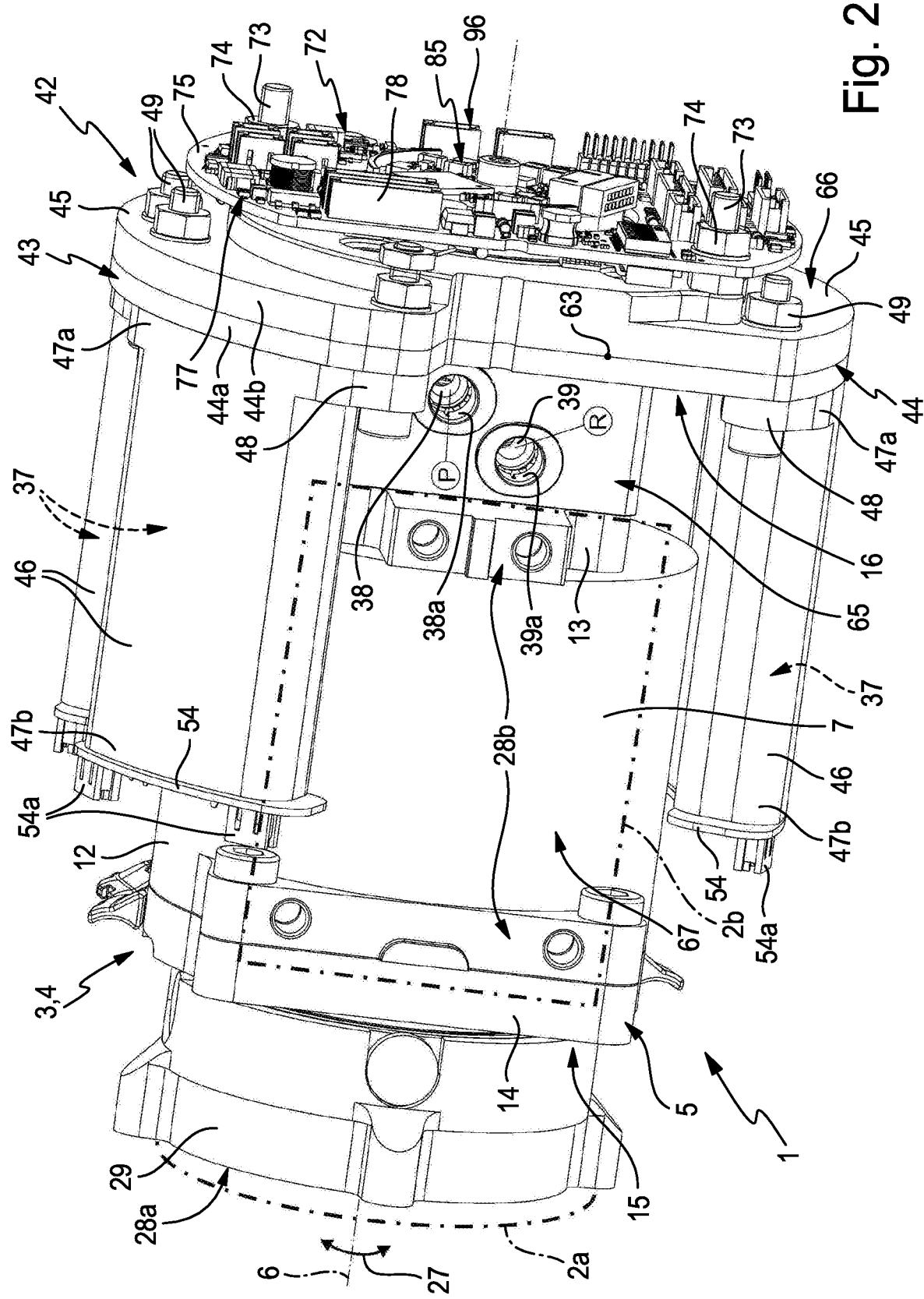
FIG. 2 shows the rotary drive device from FIG. 1 in a further perspective view from a different viewing angle, whereby the end sections of two arm members of a robot arm are indicated in dot-dashed lines, which are fastened to the rotary drive device for forming a robot arm.

The figures show a section of a robot arm generally designated by reference numeral 1. The robot arm 1 has a plurality of arm members 2a, 2b, indicated only by dot-dashed lines, which are always connected in pairs by an arm joint 3 of the robot arm 1. The arm joint 3 is formed by a rotary drive device 4 which is shown in most of the figures of the drawing without the arm members 2a, 2b.

The use of the rotary drive device 4 as an arm joint 3 in a robot arm 1 is particularly advantageous, but in no way represents the only possibility of use for the rotary drive device 4. The same can be used for any arbitrary application that involves rotating and/or rotational angular positioning of two components relative to one another. For example, the rotary drive device 4 can be used for rotating and/or rotationally positioning two machine parts of a production plant or a packaging machine. This list is not exhaustive.

The rotary drive device 4 includes a fluid operated rotary actuator 5. It is operated using a pressurised drive fluid, which may be liquid or gaseous, and which is preferably compressed air. The description of the preferred embodiment is based on an operation with compressed air.

The rotary drive 5 has a longitudinal extension with a central longitudinal axis represented below as the main axis 6.

The rotary drive 5 has a drive housing 7, in which a housing interior 8 is formed. The main axis 6 forms the centre of the housing interior 8. The housing interior 8 is delimited radially outside by a side wall 12 of the drive housing 7 extending peripherally around the main axis 6, which expediently has a circular cylindrical outer contour.

The housing interior 8 is expediently designed circular cylindrically and arranged coaxially to the main axis 6.

The housing interior 8 is delimited at the two opposite end faces on the one hand by a front end wall 13 and on the other hand by a rear end wall 14 of the drive housing 7. By way of example, the peripheral side wall 12 is integrally formed with the rear end wall 14, so that a cup-like structure results, while the front end wall 13 is in this respect separately formed and secured by fixing screws or other fastening means to the peripheral side wall 12.

The drive housing 7 has an axial front side 15 arranged in front of the end wall 13 and an axial rear side 16 which is opposite to the rear end wall 14 relating thereto.

A drive shaft 17 of the rotary drive 5 extends coaxially through the drive housing 7, whereby the longitudinal axis of the drive shaft 17 coincides with the main axis 6. The drive shaft 17 is rotatable relative to the drive housing 7 about the main axis 6 as a rotation axis, whereby a bearing device 18 is in each case provided for pivotal mounting on the two end walls 13, 14, which is in particular a rolling contact bearing device. The drive shaft 17 is supported in a smoothly rotatable position by the bearing device 18 and at the same time is supported in a radial and axial direction in relation to the main axis 6 relative to the drive housing 7.

Figure 5:
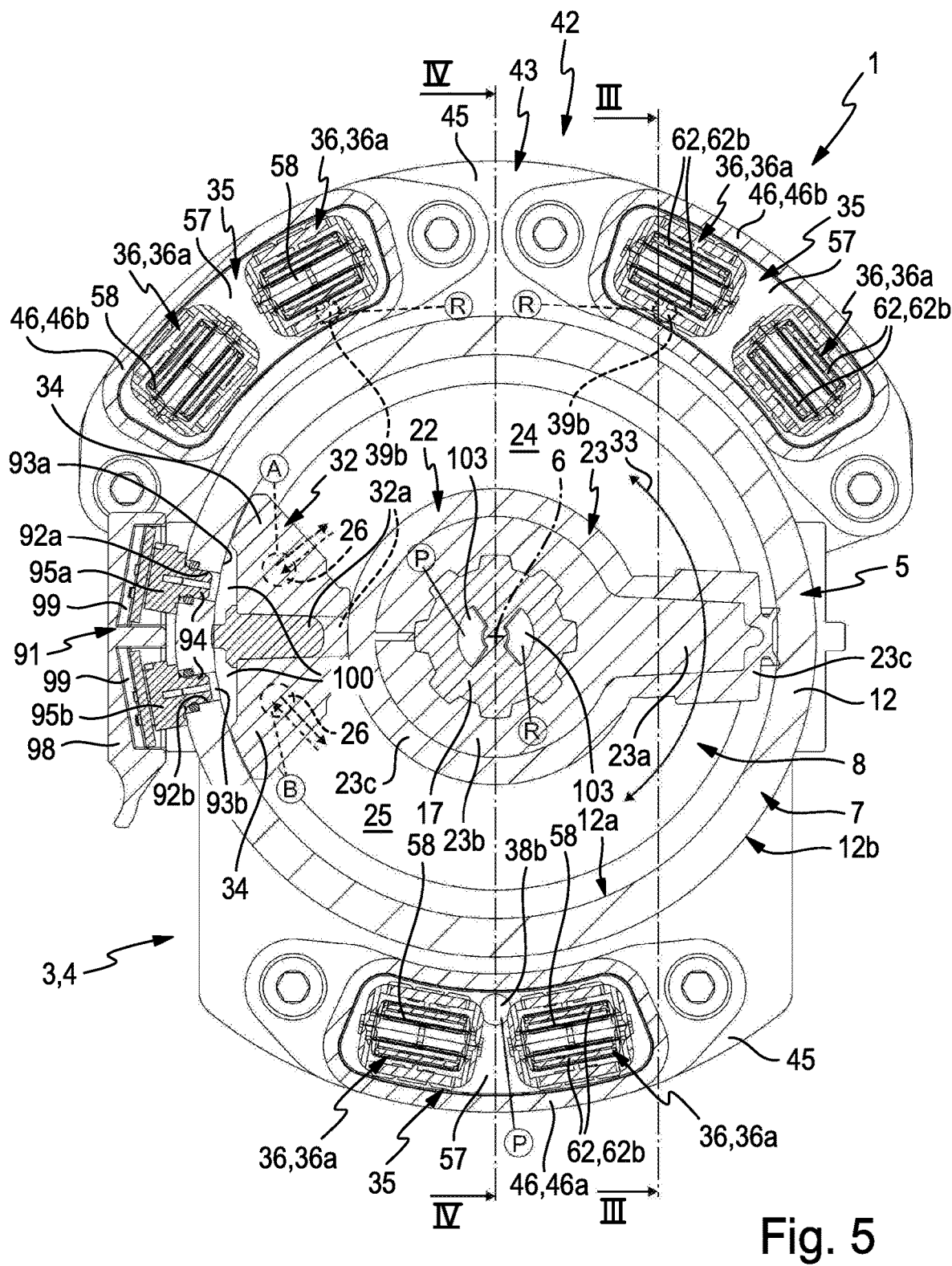
FIG. 5 shows a cross section of the rotary drive device according to section line V-V of FIG. 1.

The drive shaft 17 is part of a drive unit 22, of which a pivot piston 23 arranged in the housing interior 8 is also a part. The pivot piston 23 is non-rotatably connected to the drive shaft 17, for example by being attached with an internal toothing on an outer toothing of the drive shaft 17, as can be seen in FIG. 5.

Assisted by the pivot piston 23, the housing interior 8 is subdivided into a first drive chamber 24 and a second drive chamber 25 in a fluid-tight manner. A first working channel A opens into the first drive chamber 24, and a second working channel B opens into the second drive chamber 25, each with an inner channel entrance 26.

Preferably, the two inner channel entrances 26 are arranged on the rear end wall 14, which is penetrated by the two working channels A, B in particular in the axial direction.

A controlled fluid admission flow of the two drive chambers 24, 25 and thus of the pivot piston 23 with the drive fluid is possible through the working channels A, B, in order to cause a rotative drive movement 27 of the drive unit 22 about the main axis 6 as a rotation axis, indicated by a double arrow. The direction of rotation is predetermined by the pressure difference existing between the two drive chambers 24, 25. By setting an equally high pressure, the drive unit 22 can be held non-rotatably relative to the drive housing 7 in any arbitrary rotational position.

The drive movement 27 can be tapped on a drive section 17a of the drive shaft 17, which projects from the drive housing 7 on the axial front side 15.

On the drive section 17a, a first mounting interface 28a is arranged, on which a component to be moved rotatively can be fixed. By way of example, one arm member 2a of the two arm members 2a, 2b is attached to the first mounting interface 28a.

The first mounting interface 28a may be formed directly on the drive shaft 17, but is preferably part of a separate interface body 29 which is attached to the drive section 17a, for example by a screw connection.

The drive movement 27 is limited to a rotation angle which is smaller than 360 degrees. The maximum rotation angle is for example 270 degrees. The drive movement 27 can optionally be oriented both clockwise and counterclockwise.

In order to generate the torque which causes the drive movement 27, the pivot piston 23 has a wing section 23a, which protrudes on one side from the drive shaft 17 in a radial direction relative to the main axis 6. The pivot piston 23 preferably also has a bushing section 23b, which is coaxially penetrated by the drive shaft 17 and is fixed non-rotatably on the drive shaft 17 in the manner described above. The pivot piston 23 is provided on its outer surface with at least one seal 23c, which slidably abuts under seal against the inner surface of the drive housing 7 bounding the housing interior 8.

The section of the seal 23c extending in the housing interior 8 next to the wing section 23a along the radial outer circumference of the bushing section 23b is slidably in sealing contact with a partition wall element 32 which is fixed in the housing interior 8 with a radial distance from the main axis 6. The partition wall element 32 is surrounded by a partition wall seal 32a, which sealingly abuts not only the seal 23c of the pivot piston 23 but also the radial inner circumferential surface 12a of the peripheral side wall 12 and the axial inner surface of the two end walls 13, 14. In this way, the partition wall element 32 and the pivot piston 23 jointly delimit the two drive chambers 24, 25, which are partial chambers of the housing interior 8.

The pivot piston 23 can be driven by a controlled fluid admission flow of the two drive chambers 24, 25 to a pivoting movement 33 visualised by a double arrow with the main axis 6 as a pivot axis, from which the drive movement 27 directly results, which can be picked up at the drive section 17a.

The partition wall element 32 expediently also functions as a stop element for specifying a maximum pivot angle of the pivot piston 23. For this purpose, the partition wall element 32 has abutment sections 34 projecting on both sides of the partition wall seal 32a in the circumferential direction of the main axis 6, which are oriented in the direction of the pivoting movement 33 and against which the pivot piston 23 with its wing section 23a can impinge in order to specify two opposite end positions of the pivotal movement 33. A maximum pivot angle of the pivot piston 23 is mechanically predetermined by the abutment section 34, which is smaller than 360 degrees.

For fastening the other arm member 2b of the two arm members 2a, 2b, a second mounting interface 28b is formed on the outside of the drive housing 7, in particular on the outside of the peripheral side wall 12. The same comprises in the embodiment a plurality of mounting holes for screw mounting the respective arm member 2b.

In another application of the rotary drive device 4, any arbitrary machine part may be attached to the second mounting interface 28b.

For controlled fluid admission flow of the two drive chambers 24, 25, the rotary drive device 4 is equipped with an electrically actuatable control valve arrangement 35. This control valve arrangement 35 comprises at least one electrically actuatable control valve 36, whereby it is expedient if the control valve arrangement 35 has a plurality of such electrically actuatable control valves 36, as apply to the illustrated embodiment.

Figure 6:
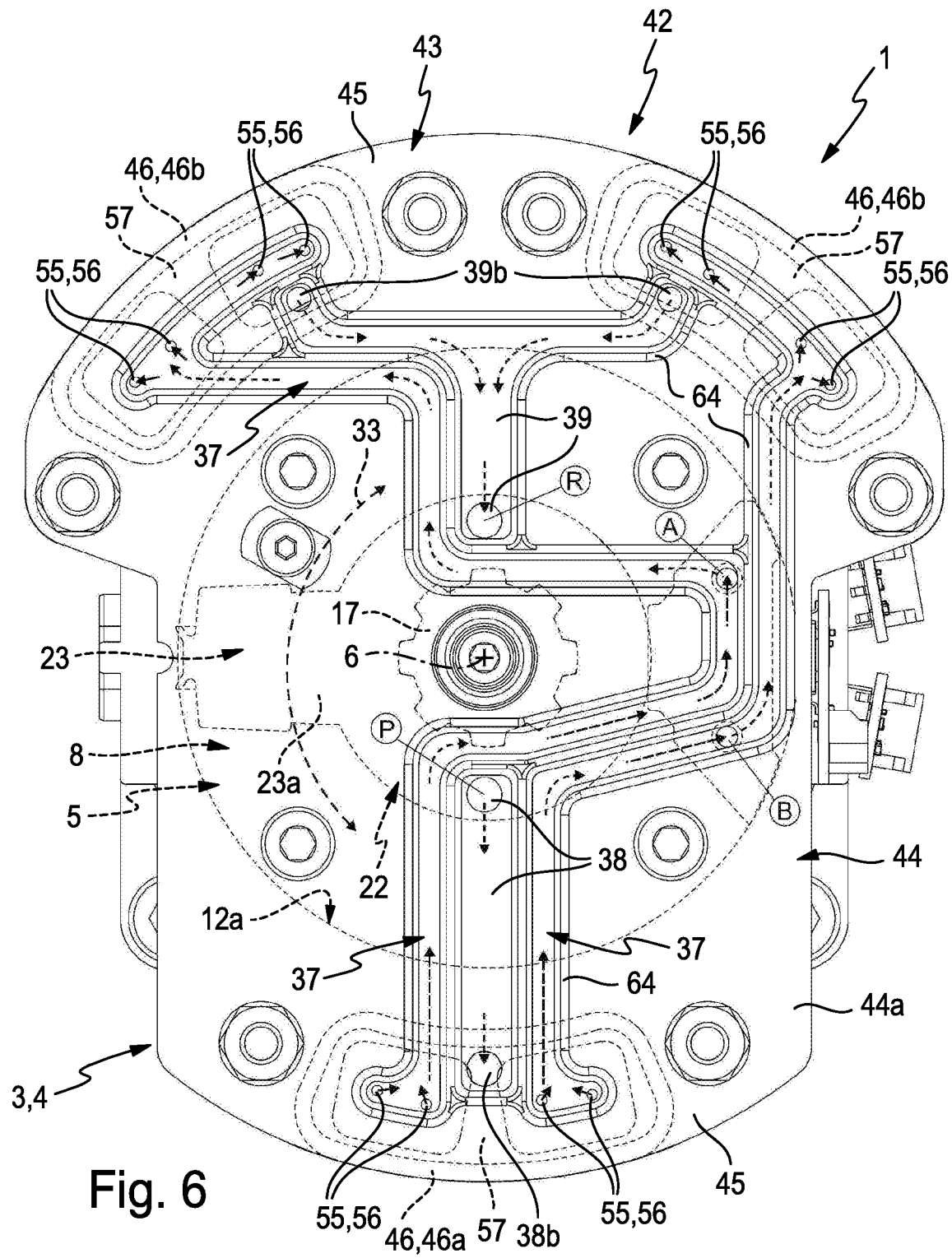
FIG. 6 shows a further cross section of the rotary drive device according to section line VI-VI from FIG. 1
Figure 7:
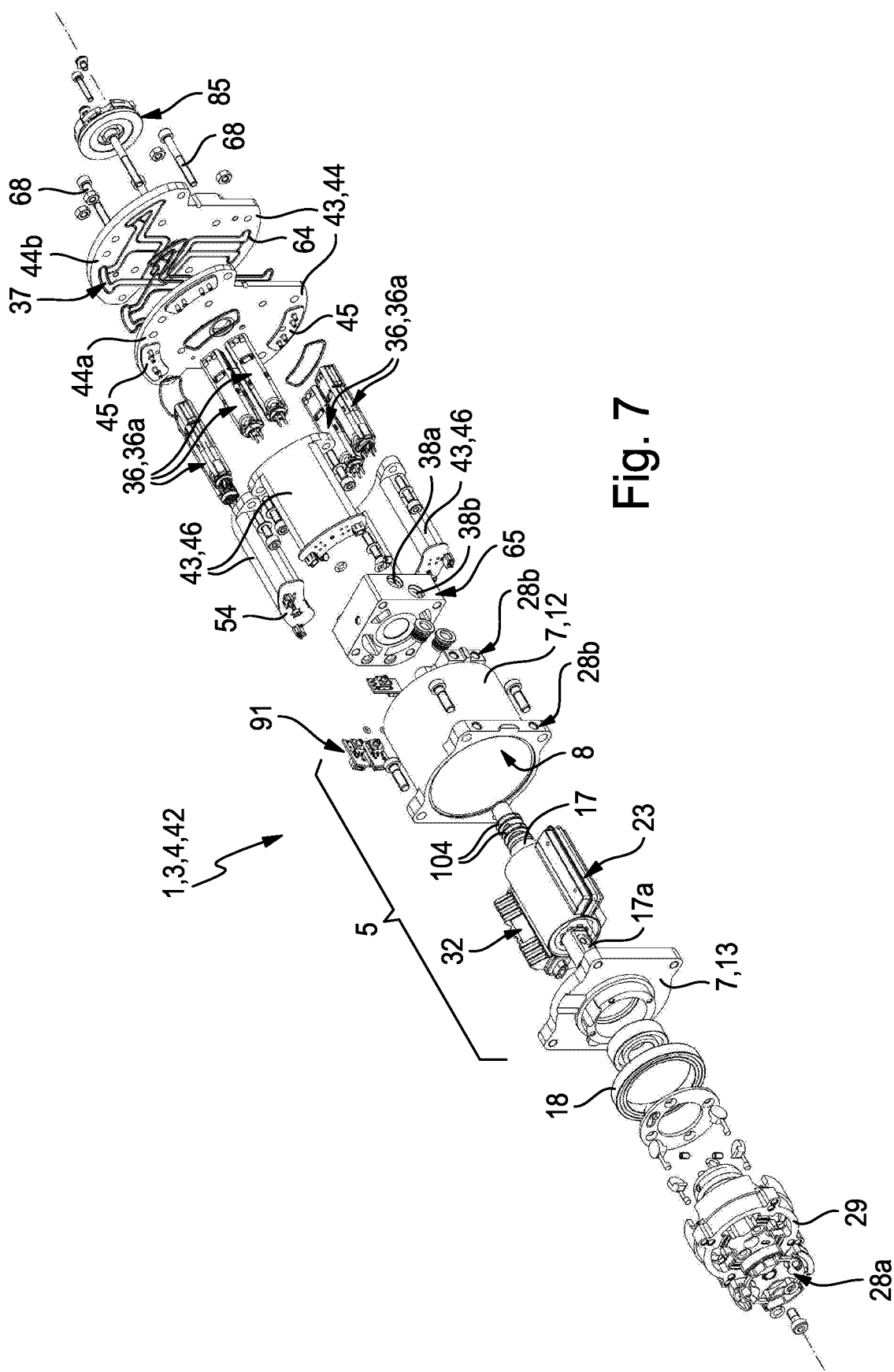
FIG. 7 shows an isometrically exploded view of the rotary drive device from FIGS. 1 to 6.

The control valve arrangement 35 is fluidically connected to the two drive chambers 24, 25 via a control fluid channel system 37, the essential components of which are apparent in particular from FIG. 6. The two working channels A, B belong to the control fluid channel system 37 and each form a channel end section of the control fluid channel system 37.

The control valve arrangement 35 is capable of controlling, on the one hand, the aeration and, on the other hand, the deaeration of each drive chamber 24, 25. During aeration, a supply of drive fluid into the respective drive chamber 24, 25 takes place, during deaeration, drive fluid is discharged from the respective drive chamber 24, 25 for depressurisation.

The control valve arrangement 35 is also connected via at least one aeration channel 38 to an aeration connection 38a. In addition, it is connected via at least one deaeration channel 39 to a deaeration connection 39a. The aeration connection 38a and the deaeration connection 39a are located on the outside of the rotary drive device 4, whereby the aeration connection 38a enables a fluidic communication with a pressure source P, in particular designed as a compressed air source, and the deaeration connection 39a enables a fluidic communication to a pressure sink R, in particular formed by the surroundings.

The two connections 38a, 39a are expediently equipped with hose connection devices, each of which enables the releasable connection of a fluid hose leading to the pressure source P or to the pressure sink R, respectively. By way of example, the connections 38a, 39a are oriented perpendicular to the main axis 6.

The control valve arrangement 35 is mounted on the drive housing 7 of the rotary drive 5 and combined in this way with the rotary drive 5 to form an in particular self-supporting drive assembly 42 which can be handled as a single unit.

Expediently, the drive assembly 42 also comprises a valve carrier device 43 to which the control valve arrangement 35 is preferably solely attached and by which the control valve arrangement 35 is fixed to the drive housing 7 of the rotary drive 5.

Preferably, each control valve 36 is attached to the valve carrier device 43, so that it is supported by the same and is fixed stationarily with respect to the drive housing 7 by means of the valve carrier device 43.

It has proved to be particularly advantageous if the valve carrier device 43 has a channel plate 44 penetrated by the control fluid channel system 37 and preferably also by the aeration channel 38 and the deaeration channel 39, to which the control valve arrangement 35 is fastened independently of the drive housing 7.

The channel plate 44 is arranged on the axial rear side 16 of the drive housing 7 and oriented in such a way that its panel plane projects perpendicular to the main axis 6.

The channel plate 44 has one or more edge sections 45 radially projecting beyond the drive housing 7, to each of which at least one of the plurality of control valves 36 is attached so as to be fluidly connected to the control fluid channel system 37 in the channel plate 44.

According to a preferred exemplary embodiment realised in the illustrated embodiment, the valve carrier device 43 comprises a plurality of cup-shaped structures designated as valve housing cups 46 which are respectively fixed to one of the edge sections 45 of the channel plate 44 and in which at least one of the control valves 36 is incorporated.

Each valve housing cup 46 has a mounting flange 48 at a first axial end section 47a, with which it is attached under seal to the front end face of the edge section 45 pointing towards the axial front side 15 and is secured by means of fixing screws 49 or other fastening means on the channel plate 44, in particular in a detachable manner. The valve housing cup 46 is frontally intrinsically open at the first axial end section 47a and closed in the assembled state by the edge section 45 of the channel plate 44.

Each valve housing cup 46 projects away from the channel plate 44 in a finger-like manner toward the axial front side 15 and terminates freely with a second axial end section 47b opposite the channel plate 44. At this second axial end section 47b, the valve housing cup 46, which is open at the first axial end section 47a, has a cup base 52.

Each control valve 36 is supported by a second axial end section 53b on the inner surface of the cup base 52 and is thereby pressed against the channel plate 44 with its opposite first end section 53a. In this way, each control valve 36 is immovably fixed to the valve carrier device 43 in the axial direction of the main axis 6.

Expediently, the cup base 52 is provided with one or more apertures 59 through which electrical connection contacts of each control valve 36 protrude, which are contacted with a printed circuit board 54 attached to the outside of the cup base 52.

Each printed circuit board 54 is designed with at least one electromechanical interface device 54a, which is designed to supply electrical control signals for the operational control of the control valves 36.

Each control valve 36 has in particular frontally at its first axial end section 53a one or more controllable valve openings 55 which communicate with the control fluid channel system 37 running in the channel plate 44 via a respective connecting channel 56 opening out at the rear end face of the edge section 45.

In addition, the interior 57 of at least one valve housing cup 46 hereinafter referred to as aeration cup 46a is connected via an aeration opening 38b with the aeration channel 38 running in the channel plate 44, and the interior 57 of at least one valve housing cup 46 hereinafter referred to as a deaeration cup 46b is also connected via a deaeration opening 39b with the deaeration channel 39 running in the channel plate 44. The aeration opening 38b and the deaeration opening 39b respectively open in the region of the open first axial end section 47a of a valve housing cup 46 on the end face of the channel plate 44 facing the axial front side 15 and thus are in direct communication with the interior 57.

The rotary drive device 4 of the preferred illustrated embodiment comprises an aeration cup 46a and two deaeration cups 46b. This number may vary, whereby however there is at least one of each type of cup.

The interior 57 of each valve housing cup 46 is in continuous fluidic communication with the interior 58 of each control valve 36 arranged therein. Each control valve 36 has in its interior 58 at least one control element 62 movable by electrical activation, which acts on a movable valve member 62a or forms the same directly. By appropriate electrical control, the position of the control element 62 and thus the position of the valve member 62a can be changed in order to either close an associated controllable valve opening 55 or to enable a fluid passage.

Thus, each control valve 36 is able to separate the working channel A or B, connected to it via the control fluid channel system 37, from the interior space 57 of the associated valve housing cup 46 or to connect with this interior 57, in this way, depending on whether it is an aeration cup 46a or an deaeration cup 46b, it is able to either aerate or deaerate the associated working channel A or B and thus the connected drive chamber 24, 25, or to shut this off for blocking the drive fluid therein.

It is possible to connect the several control valves 36 contained in on and the same valve housing cup 46 to the same working channel A or B by appropriate design of the control fluid channel system 37, or to connect the one control valve 36 to the first working channel A and the other control valve 36 to the second working channel B. The corresponding selection is made in particular as a function of the flow rate to be managed.

The channel plate 44 is expediently subdivided in a joining plane 63, which is perpendicular to the main axis 6, into two first and second channel plate bodies 44a, 44b, each plate-shaped. The control fluid channel system 37 extends in the joining plane 63 and is formed by groove-shaped recesses formed in one and/or the other channel plate body 44a, 44b, which are sealed to the surroundings by the other channel plate body 44b, 44a with the interposition of a sealing mask 64.

The aeration connection 38a and the deaeration connection 39a are expediently formed together in a pneumatic connection unit 65, which is arranged in the region of the axial rear side 16 of the drive housing 7 and which is expediently also a component of the drive assembly 42. It consists for example of a block-shaped body, which is penetrated by the aeration channel 38 and the deaeration channel 39 and which is attached to the channel plate 44, such that both the aeration channel 38 and the deaeration channel 39 in the channel plate 44 continue to be constantly fluidically connected to at least one of the interiors 57 of the valve housing cup 46.

The term "pneumatic" in the pneumatic connection unit 65 is to be understood as representative of use with any type of pressurised fluid and is not limited to compressed air. This is merely to express that the connection unit 65 forms a fluidic interface, at which the drive fluid is fed into the rotary drive device 4 or discharged therefrom.

The pneumatic connection unit 65 is formed integrally with the channel plate 44 and in particular with one of the two channel plate bodies 44a, 44b in a non-illustrated embodiment.

It is considered particularly advantageous if the pneumatic connection unit 65 is a separate component with respect to the valve carrier device 43, which applies to the illustrated embodiment.

By way of example, the pneumatic connection unit 65 is integrated, relative to the axial direction of the main axis 6, between the rear end wall 14 of the drive housing 7 and the channel plate 44 of the valve carrier device 43. This has the advantage that the rear side 66, which is axially averted away from the rotary drive 5 of the valve carrier device 43 and in particular of the channel plate 44, is available for the attachment of other components of the drive assembly 42. In principle, it would certainly be possible to mount the valve carrier device 43 directly to the drive housing 7 and to arrange the pneumatic connection unit 65 on the rear side 66 of the valve carrier device 43.

The control fluid channel system 37, which connects the two drive chambers 24, 25 to the control valve arrangement 35, is expediently formed in its entirety within the drive assembly 42 without hoselines or pipelines being involved. This prevents damage and facilitates external cleaning. In addition, the drive assembly 42 can be assembled in this way during its manufacture quickly and error-free.

Each control valve 36 of the control valve arrangement 35 is expediently arranged at least partially in the region of the peripheral outer circumferential surface 67 of the drive housing 7 which points radially outward with respect to the main axis 6. Preferably, the control valves 36 each extend at least partially along the peripheral side wall 12.

Due to the pneumatic connection unit 65 integrated between the valve carrier device 43 and the drive housing 7, the channel plate 44 is arranged at an axial distance from the drive housing 7. The control valves 36 projecting from the channel plate 44 toward the axial front side 15 thus have a longitudinal section associated with their first axial end section 53a, which extends along the axial distance between the channel plate 44 and the drive housing 7 and to which a further longitudinal section of the control valve 36 connects, which extends from the axial rear side 16 axially along the radial outer circumferential surface 67 of the drive housing 7, whereby the control valve 36, however, ends at an axial distance in front of the axial front side 15 of the drive housing 7.

Thus, there is a configuration in which each control valve 36 projects beyond the axial rear side 16 of the drive housing 7, but at the same time the drive housing 7 projects beyond the control valves 36 in the region of its axial front side 15.

The aforementioned embodiments relating to the control valves 36 apply in accordance for the valve housing cup 46 accommodating the control valves 36.

According to an embodiment not illustrated, the control valves 36 extend over the entire axial length of at least the peripheral side wall 12 of the drive housing 7 and in particular of the entire drive housing 7.

The control valves 36 are arranged so that there is only a very small radial distance to the peripheral side wall 12. As a result, the drive assembly 42 has very small transverse dimensions.

According to an embodiment not illustrated, the control valves 36 are displaced axially back relative to the drive housing 7 so that they do not overlap the peripheral side wall 12 of the drive housing 7 at all.

The described arrangement of the control valves 36 can be realised particularly advantageously in conjunction with control valves 36, which are designed as piezoelectric valves 36a, which applies to the illustrated embodiment.

The piezoelectric valves 36a have a longitudinal shape and are aligned so that their respective longitudinal axis 69 is parallel to the main axis 6.

Each piezoelectric valve 36a comprises at least one lamellar control element 62, which is designed as a bending transducer 62b, which is deflectable according to the reverse piezoelectric effect for opening and closing an associated controllable valve opening 55, if it is electrically controlled with a corresponding drive voltage.

Each bending transducer 62b expediently extends in the longitudinal direction of the drive housing 7.

At least some, but preferably all control valves 36 of the control valve device 35 are preferably designed so that they are independently electrically actuatable.

The control valves 36 of the control valve arrangement 35 are preferably arranged distributed around the main axis 6. With reference to a medial plane containing the main axis 6, it is expedient to provide that the at least one aeration cup 46a is placed on one side and the at least one deaeration cup 46b is placed on the other side of this medial plane.

Figure 3:
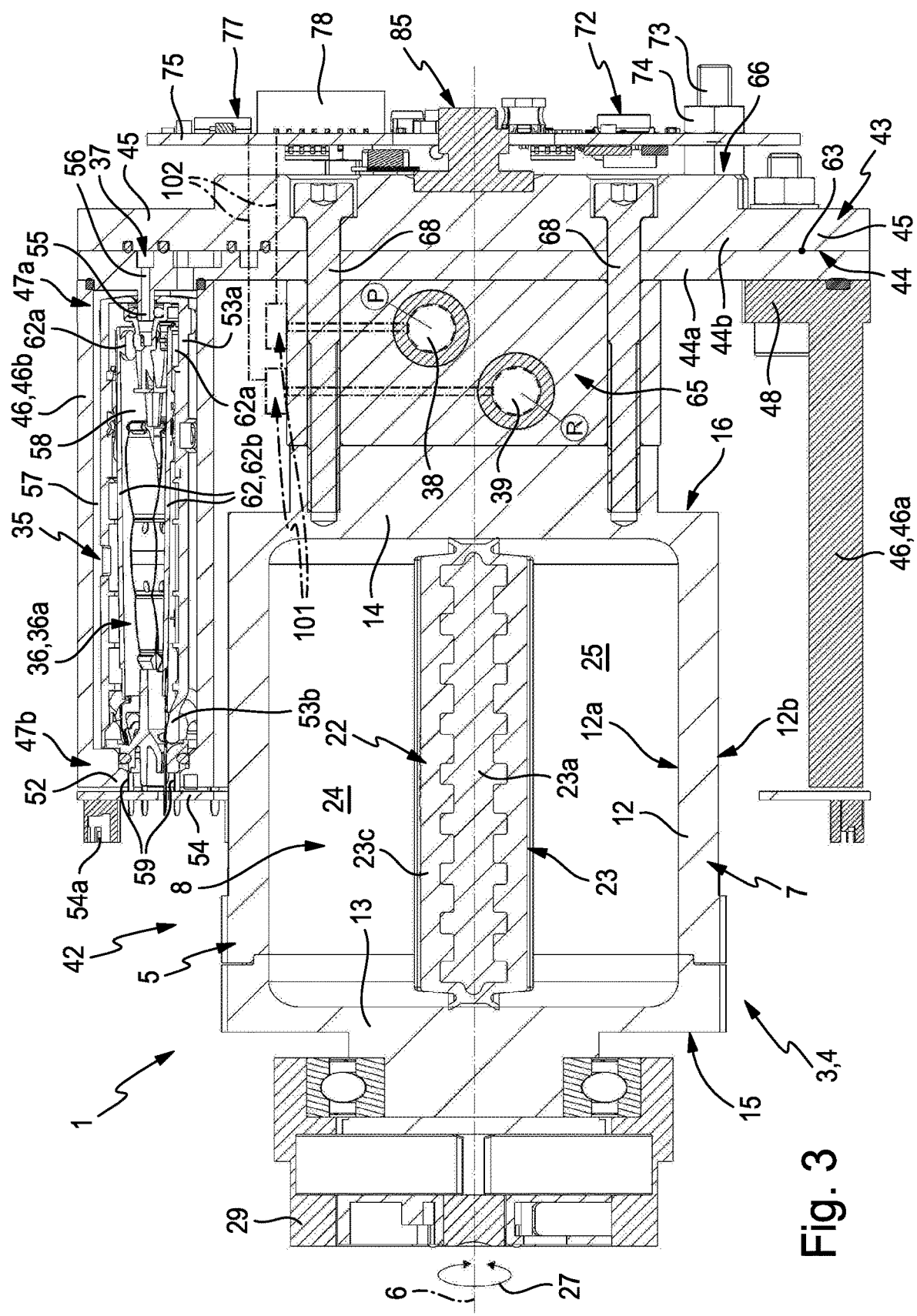
FIG. 3 shows a longitudinal cross section of the rotary drive device according to section line from FIG. 5.

As can be clearly seen in particular from FIG. 3, the valve carrier device 43 is preferably fixed to the drive housing 7 by means of fixing screws 68. The fixing screws 68 exemplarily pass through the channel plate 44, on which they are supported with their screw heads, whereby they are screwed with their threaded shaft into each internal thread, which is formed in the rear end wall 14 of the drive housing 7.

With the same fixing screws 68, the pneumatic connection unit 65 is expediently attached. The fixing screws 68 pass through the pneumatic connection unit 65 provided with corresponding through holes, so that the same is clamped between the drive housing 7 and the channel plate 44 of the valve carrier device 43.

If the channel plate 44 is composed of a plurality of adjoining channel plate bodies 44a, 44b, these two channel plate bodies 44a, 44b are expediently clamped together axially by the fixing screws 68.

In this way, there is a modular design that favours the manufacture and assembly of the individual components of the drive assembly 42.

Expediently, the drive assembly 42 also contains, as a further module-like component, an electronic control unit 72 which is electrically connected to the control valve arrangement 35 for its electrical actuation.

The electronic control unit 72 is preferably arranged in the region of the axial rear side 16 of the drive housing 7. If the drive assembly 42 comprises a valve carrier device 43, which applies to the illustrated exemplary embodiment, the electronic control unit 72 is preferably placed on the rear side 66 of the valve carrier device 43.

The electronic control unit 72 is expediently attached directly to the valve carrier device 43, independently of the drive housing 7. It can therefore be mounted and demounted if necessary, without also having to release the valve carrier device 43 from the rotary drive 5.

The preferably detachable fastening of the electronic control unit 72 to the valve carrier device 43 is effected in particular by means of a plurality of stud bolts 73 with an external thread, which are anchored in the channel plate 44, and thereby expediently in the second channel plate body 44b, and protrude backwards away from the drive housing 7 over the valve carrier device 43. On these stud bolts 73, the electronic control unit 72 is attached and fixed by means of fastening nuts 74 screwed onto the stud bolts 73.

The fixing of the electronic control unit 72 is expediently carried out on a printed circuit board 75 of the electronic control unit 72, which has fastening holes through which the stud bolts 73 protrude. The circuit board 75 is oriented so that the circuit board plane extends perpendicular to the main axis 6.

The electronic control unit 72 is connected to the electromechanical interface devices 54a via a first electrical conductor arrangement 76, indicated by dot-dashed lines, which is realised in particular in the form of electric cables, in order to provide the electrical connection between the electronic control unit 72 and the control valve arrangement 35, which enables an electrical activation.

The electronic control unit 72 is able to generate at least one variable-level electrical drive voltage, which is communicated as a control signal to the control valve arrangement 35 to operate the control valves 36 as required.

In particular, when the control valves 36 are designed as piezoelectric valves 36a, it is advantageous if the electronic control unit 72 has a high-voltage stage 77, by means of which a high-voltage drive voltage suitable for controlling the bending transducers 62b can be generated. The high-voltage stage 77 is thus also an integral part of the drive assembly 42.

The electronic control unit 72 is designed to enable coordination with respect to its operation with other electrically actuatable devices, in particular with other rotary drive devices 4 used as arm joints 3. For this purpose, it is equipped with an electromechanical interface device 78 to which a serial bus system 82 is connected or connectable, which establishes a control-technical connection with a superordinate external electronic control device 83, for example by means of electrical cables.

The bus system can alternatively also be designed for parallel signal transmission with a 1:1 wiring.

The electromechanical interface device 78 is designed in particular such that serial bus signals can be looped through in accordance with arrow 84 in order to make a connection with a further device to be controlled.

The serial bus system 82 may operate on any arbitrary bus protocol. The electronic control unit 72 is designed, for example, to be able to connect a so-called CAN bus or a so-called IO-Link bus communication system.

Expediently, the rotary drive device 4 is provided with an encoder 85, that is, in other words, a rotary encoder which is designed to detect and evaluate the instantaneous rotation angle between the rotatively movable drive unit 22 and the drive housing 7. In this way, a detection of the instantaneous relative rotational position between the drive unit 22 and the drive housing 7 is possible. When used as an arm joint 3 of a robot arm 1, the instantaneous relative pivoting position between the two arm members 2a, 2b can be detected in this way.

Via a second electrical conductor arrangement 86, indicated by dot-dashed lines, the encoder 85 is suitably connected to the internal electronic control unit 72 of the rotary drive device 4, which is designed to command the electrical control of the control valve arrangement 35 on the basis of the electrical output signals of the encoder 85.

The encoder 85 is preferably designed as an incremental encoder. The encoder 85 can be implemented as an absolute value encoder or as a relative value encoder.

Preferably, the encoder 85 is arranged on the axial rear side 16 of the drive housing 7. If the rotary drive device 4 has a valve carrier device 43 attached to the rear of the drive housing, the encoder 85 is expediently arranged on its axial rear side 66. The latter applies to the embodiment.

The drive shaft 17 expediently has an end section 17b axially opposite the drive section 17a, which passes through the rear end wall 14 of the drive housing 7 and projects on the axial rear side 16 of the drive housing 7. This rear end section 17b defines a detection section 87 for a rotary drive device 4 equipped with an encoder 85, which is operatively connected to the encoder 85. The detection section 87 is exemplified by the free end section of the rear end section 17b of the drive shaft 17.

At this detection section 87, a movable encoder unit 85a is non-rotatably mounted, which participates in the rotative drive movement 27 of the drive unit 22. This movable encoder unit 85a cooperates contactlessly in a conventional manner with an encoder unit 85b attached in a fixed location relative to the drive housing 7, which is exemplarily mounted on the valve carrier device 43 and in particular on the rear side of the channel plate 44. The fixed encoder unit 85b is connected to the electronic control unit 72 via the above-mentioned second electrical conductor arrangement 86.

The encoder 85 is expediently arranged coaxially with respect to the drive shaft 17. It can be optimally integrated into the drive assembly 42, if the circuit board 75 of the electronic control unit 72 has a central aperture 88 in which the encoder 85 extends and which is penetrated in particular by the encoder 85. The aperture 88 is preferably circular. The encoder 85 can thus be arranged in a common plane with the electronic control unit 72, whereby this common plane projects perpendicular to the main axis 6.

Preferably, the electronic control unit 72 also has a main plane of expansion perpendicular to the main axis 6, such as the channel plate 44 of the valve carrier device 43. This gives the drive assembly 42 particularly short length dimensions.

The fluid-operated rotary drive device 4 is preferably equipped with a pressure detecting device 91, which is designed to detect the fluid pressure currently prevailing in each of the two drive chambers 24, 25. The detected pressure values are used in particular for carrying out a pressure regulation, with the aid of which the rotary drive movement 27 including the rotative positioning of the drive unit 22 can be carried out or is carried out.

The pressure detecting device 91 is expediently arranged on the rotary drive 5. As can be seen in particular from FIG. 5, the detection of the fluid pressure prevailing in the drive chambers 24, 25 takes place through a pressure detection channel 92a, 92b, by which a first pressure detection channel 92a opens out into the first drive chamber 24 via a first inner channel entrance 93a and a second pressure detection channel 92b opens out into the second drive chamber 25 via a second inner channel entrance 93b.

Preferably, the pressure detecting channels 92a, 92b are not formed by the working channels A, B, but are formed as separate fluid channels in this regard and thus also with respect to the control fluid channel system 37. This allows a particularly reliable pressure detection, which is independent of pulse-like pressure fluctuations that can occur in the working channels A, B in particular when the control valves 36 switch between an aeration process and a deaeration process.

In the illustrated preferred embodiment, the pressure detecting channels 92a, 92b penetrated the peripheral side wall 12 of the drive housing 7, so that the inner channel entrances 93a, 93b are located on the exemplary circular cylindrical radial inner peripheral surface 12a of the peripheral side wall 12 enclosing the housing interior 8.

The pressure detecting device 91 is preferably arranged on the radial outer circumferential surface 12b of the peripheral side wall 12 facing away from the main axis 6.

The pressure detecting device 91 expediently emerges from the outside of the peripheral side wall 12, with a pressure pickup connection 94 in each pressure detection channel 92a, 92b. On the end face of the pressure pickup connection 94 is in each case a pressure pickup aperture for the prevailing fluid pressure in the associated drive chamber 24, 25. In this way, the pressure detection takes place practically immediately in the respective drive chamber 24, 25, which entails a high pressure detection accuracy.

The pressure detecting device 91 expediently contains a separate pressure sensor for each drive chamber 24, 25, so that a first pressure sensor 95a is associated with the first drive chamber 24 and a second pressure sensor 95b is associated with the second drive chamber 25. Each pressure sensor 95a, 95b has one of the pressure pickup connections 94 and is inserted or plugged from outside the drive housing 7 in the associated pressure detection channel 92a, 92b. Each interposed seal prevents undesirable fluid leakage from the drive chambers 24, 25 to the surroundings.

Preferably, the rotary drive device 4 includes an electronic pressure regulation unit 96, to which the pressure detecting device 91 is connected via a third electrical conductor arrangement 97 indicated by a dot-dashed line. The pressure regulation unit 96 is designed in particular as an integral part of the electronic control unit 72. Accordingly, the pressure regulation unit 96 is located in the region of the axial rear side 16 of the drive housing 7 and in particular on the rear side 66 of the valve carrier device 43.

The previously described electrical conductor arrangements 76, 86, 97 are preferably designed as flexible electrical cables which are laid in the region of the outer circumference of the rotary drive 5.

The pressure detecting device 91 is expediently arranged on a sensor holder 98 mounted radially on the outside of the drive housing 7. The sensor holder 98 is attached to the radial outer circumferential surface 12b of the peripheral side wall 12 and fixed there in particular by fixing screws. In the sensor holder 98, which is preferably made of plastic material, a receiving section 99 is preferably formed for each pressure sensor 95a, 95b, which receives and holds the associated pressure sensor 95a, 95b. The pressure sensors 95a, 95b are expediently combined with the sensor holder 98 to form an assembly that can be handled as a single unit when it is mounted on the rotary drive 5.

Figure 4:
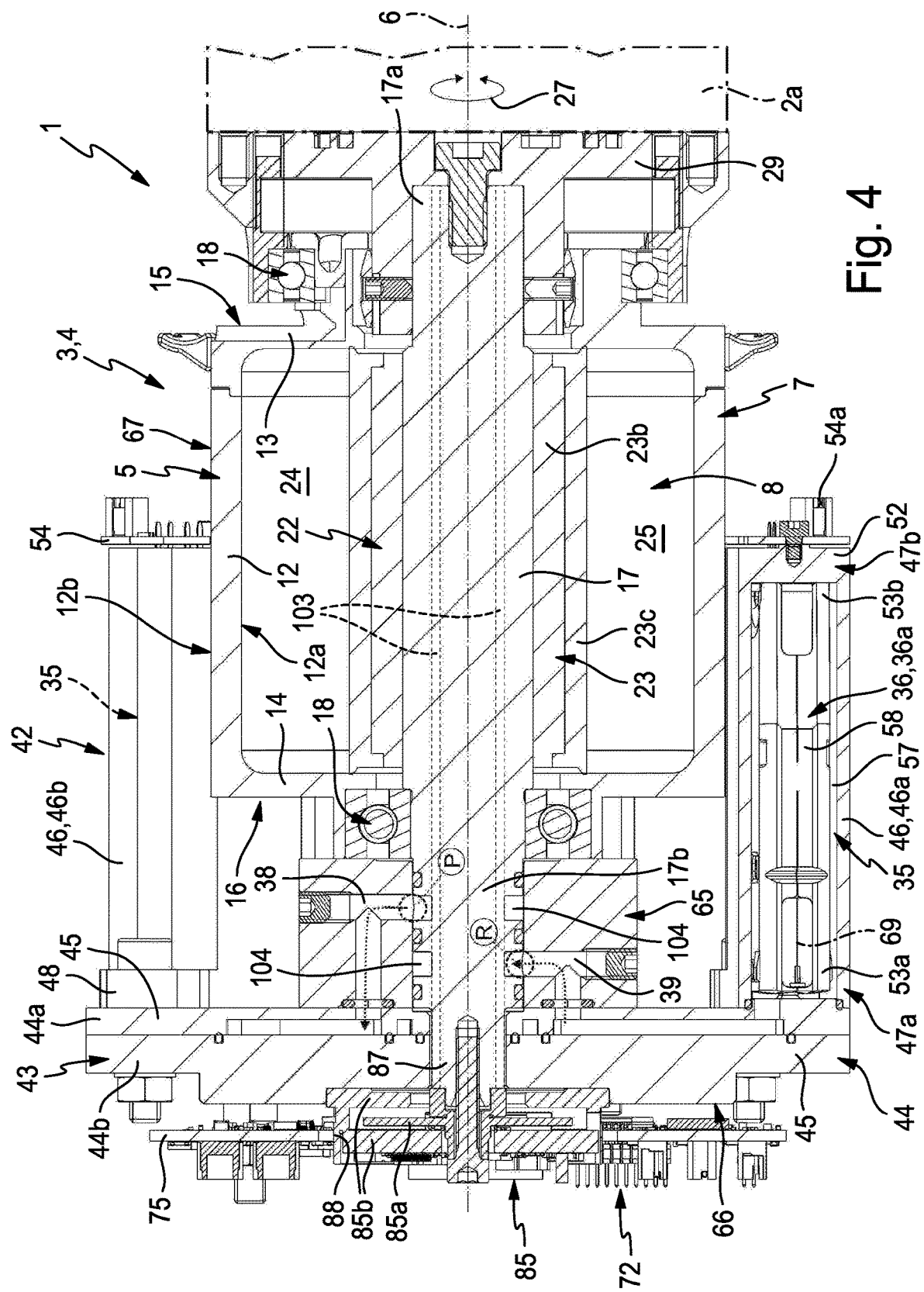
FIG. 4 shows a further longitudinal cross section of the rotary drive device according to section line IV-IV from FIG. 5.

As can be clearly seen in particular from FIG. 4, both the inner channel entrances 26 of the two working channels A, B and the inner channel entrances 93a, 93b of the two pressure detecting channels 92a, 92b are placed in the housing interior 8 in such a way that they are outside the pivoting range, which is passed over by the wing section 23a of the pivot piston 23 during its pivoting movement 33. These inner channel entrances 26, 93a, 93b are located correctly on the same side and the other side of the partition wall seal 32a, immediately adjacent to the partition wall element 32.

Each of the two inner channel entrances 93a, 93b of the pressure detecting channels 92a, 92b is expediently located in a region, past which one of the two abutment sections 34 extends. Each abutment section 34, together with the radially adjacent circumferential section of the peripheral side wall 12, delimits a section of the associated drive chamber 24, 25, into which one of the pressure detecting channels 92a, 92b opens out, in order to act as a pressure pickup section 100 in which pressure sensing occurs. Since the abutment sections 34 do not interact sealingly with the wall of the drive housing 7, the abutment sections 34 are surrounded by the drive fluid located in the respective associated drive chamber 24, 25, which consequently is also present in the pressure pickup sections 100.

Preferably, the inner channel entrances 26 of the working channels A, B lie in the circumferential direction of the main axis 6 in the same area as the abutment sections 34, so that they are covered by the same. Since the abutment sections 34 are arranged at an axial distance from the axial end walls 13, 14 of the housing interior 8, a gap is however provided which allows unimpeded inflow and outflow of the drive fluid preferably in the form of compressed air.

In FIGS. 5 and 6, the fluid flow of the drive fluid which is possible for actuating the rotary drive 5 is indicated by flow arrows. Dashed flow arrows illustrate the aeration flow, dotted flow arrows illustrate the deaeration flow.

The pressure regulation unit 96 is designed to adjust the pressure difference prevailing in the two drive chambers 24, 25 so that the drive unit 22 performs a desired drive movement 27 and/or is positioned and held in a desired rotational position with respect to the drive housing 7. The rotational speed can be influenced by the level of the set pressure difference. At the same level of pressure in the two drive chambers 24, 25, the rigidity of the system can be predetermined by the extent of the pressure level. The encoder 85 provides instantaneous rotation angle information that is processed during pressure regulation.

The rotational positioning of the drive unit 25, which is pressure-controlled in this manner, expediently takes place in the internal electronic control unit 72 of the rotary drive device 4, whereby the target values are however expediently predetermined by the superordinate electronic control device 83. In this way, an optimal coordination of several rotary drive devices 4 communicating for control purposes with the same superordinate control device 83 is possible.

It is advantageous if the pneumatic connection unit 65 is equipped with a further pressure detecting device 101, which is indicated only schematically by dot-dashed lines in the drawing and which is designed to detect the fluid pressure, which is present at the aeration connection 38a and/or at the deaeration connection 38b. With the help of the pressure values thus acquired, in particular diagnostic functions are possible, for example, verifications as to whether a sufficiently large supply pressure is present and/or whether perfect, backflow-free fluid discharge is ensured. In addition, for example, the detection of the pressure gradient of the valve characteristic is possible.

The further pressure detecting device 101 is expediently connected to the electronic control unit 72 via a fourth electrical conductor arrangement 102.

As can be seen in particular from FIG. 4, the drive shaft 17, with its rear end section 17b projecting from the drive housing 7 on the axial rear side 16, passes through both the pneumatic connection unit 65 and the channel plate 44 of the valve carrier device 43 in a rotatable manner relating thereto.

The drive shaft 17 is expediently traversed in its longitudinal direction by two fluid channels designated as shaft channels 103 for differentiation purposes, which are connected with an annular groove 104 formed in the drive shaft 17 in the longitudinal section of the rear end section 17b of the drive shaft 17, which projects through the pneumatic connection unit 65. The longitudinal sections of the aeration channel 38 and of the deaeration channel 39 extending through the pneumatic connection unit 65 each have a branch via which they communicate with one of the two annular grooves 104. In this way, one of the two shaft channels 103 is constantly connected to the aeration connection 38a and the other is constantly connected to the deaeration connection 39a regardless of the rotational position of the drive shaft 17.

Interface means, not further illustrated in the drawings, are assigned to the shaft channels 103 in the region of the drive section 17a, to which further fluid channels can be connected in order to allow a fluidic interlinking with, for example, the rotary drive device 4 of another arm joint 3. These secondary fluid channels are preferably formed by elastically bendable fluid hoses. The same can be laid loop-shaped or helically wound in the interface bodies 29.

In the illustrated embodiment, the rotary drive 5 includes only a single drive stage formed by two drive chambers 24, 25 and a pivot piston 23 incorporated therein.

According to a not further illustrated embodiment, however, a multi-stage design is possible in which the rotary drive 5 has at its disposal a plurality and in particular two axially adjacent pivot pistons 23 which each separate a separate pair of drive chambers 24, 25 from one another and are non-rotatably connected with the same drive shaft 17. With such a design, particularly high torques can be generated.

What is claimed is:

1. A rotary drive device comprising a fluid-actuated rotary drive, which has a drive housing and a drive unit rotatable relative thereto about a main axis of the rotary drive by a controlled fluid application to at least one pivot piston arranged in the drive housing, whereby a drive shaft of the drive unit connected to the pivot piston projects from the drive housing at an axial front side of the drive housing with a drive section enabling a force output, and with a control valve arrangement comprising at least one electrically actuatable control valve, which is fluidically connected via a control fluid channel system to two drive chambers of the rotary drive separated from one another by the pivot piston in the drive housing, and which is designed to control the fluid pressurization of the two drive chambers for rotation and rotative positioning of the drive unit relative to the drive housing, wherein a pressure detecting device is arranged on the fluid-actuated rotary drive, by which the fluid pressure prevailing in the drive chambers can be detected via pressure detecting channels opening into the two drive chambers and designed separately with respect to the control fluid channel system, for enabling a pressure-regulated operating mode of the fluid-operated rotary drive, and
wherein the pressure detecting channels pass through a peripheral side wall of the drive housing radially outwardly bounding the drive chambers and open into the drive chambers on the inner circumferential surface of the peripheral side wall radially facing the main axis, and
wherein a separate pressure detection channel opens out into each of the two drive chambers, and
wherein a respective pressure sensor of the pressure detecting device is connected to each of the two separate pressure detection channels, and
wherein a sensor holder is mounted radially outside on the drive housing, and
wherein both of the pressure sensors of the pressure detecting device are arranged on the sensor holder.

2. The rotary drive device according to claim 1, wherein the pressure detecting channels with internal channel entrances open into the drive chambers in such a way that these inner channel entrances lie outside of a pivoting range, which can be traversed by a wing section of the pivot piston during the pivoting movement of the pivot piston causing the rotation of the drive unit.

3. The rotary drive device according to claim 2, wherein the pivot piston is arranged in a circular contoured housing interior of the drive housing and together with a partition wall element arranged in the housing interior subdivides the housing interior in a fluid-tight manner into the two drive chambers, wherein the partition wall element acts as a stop element by interacting with the wing section of the pivot piston to specify a maximum pivot angle of the pivot piston and wherein the inner channel entrances of the pressure detecting channels are located adjacent to the partition wall element in regions of the drive chambers which are outside of the pivoting range of the wing section defined by the maximum pivot angle of the pivot piston.

4. The rotary drive device according to claim 1, wherein the control fluid channel system opens out into each drive chamber with an inner channel entrance of a working channel, wherein the inner channel entrances of the working channels are arranged respectively to one of two end walls of the drive housing of the rotary drive axially delimiting the drive chambers.

5. The rotary drive device according to claim 1, wherein an electronic control unit connected with the control valve arrangement for the electric control thereof is arranged on the rotary drive, which is equipped with an electronic pressure regulation unit processing the fluid pressures detected in the drive chambers for rotational position control of the drive unit.

6. The rotary drive device according to claim 5, wherein the electronic control unit is arranged on an the axial rear side of the drive housing opposite the axial front side.

7. The rotary drive device according to claim 5, wherein the at least one control valve of the control valve arrangement is designed as an electrically controllable piezoelectric valve, wherein the electronic control unit has a high-voltage stage for generating a high-voltage drive voltage for the control valve arrangement.

8. The rotary drive device according to claim 5, further comprising an encoder designed to detect the rotation angle of the drive unit, which is arranged on the axial rear side of the drive housing of the rotary drive, wherein the encoder has a movable encoder unit arranged on a detection section of the drive shaft protruding on the axial rear side of the drive housing and a fixed encoder unit attached to the drive housing and cooperating contactlessly with the movable encoder unit, wherein the fixed encoder unit is electrically connected to the electronic control unit.

9. The rotary drive device according to claim 1, further comprising a pneumatic connection unit attached to the drive housing, which has, in an externally accessible manner, an aeration connection connectable or connected with an external pressure source and a deaeration connection connectable or connected to an external pressure sink, wherein the control valve arrangement is connected with both the aeration connection and with the deaeration connection.

10. The rotary drive device according to claim 1, wherein the electronic control unit has an electromechanical interface device for connecting a bus system connected to a superordinate electronic control device.

11. The rotary drive device according to claim 10, wherein the bus system is a serial bus system.

12. The rotary drive device according to claim 1, further comprising a valve carrier device carrying the control valve arrangement and attached to the drive housing.

13. A rotary drive device comprising a fluid-actuated rotary drive, which has a drive housing and a drive unit rotatable relative thereto about a main axis of the rotary drive by a controlled fluid application to at least one pivot piston arranged in the drive housing, whereby a drive shaft of the drive unit connected to the pivot piston projects from the drive housing at an axial front side of the drive housing with a drive section enabling a force output, and with a control valve arrangement comprising at least one electrically actuatable control valve, which is fluidically connected via a control fluid channel system to two drive chambers of the rotary drive separated from one another by the pivot piston in the drive housing, and which is designed to control the fluid pressurization of the two drive chambers for rotation and rotative positioning of the drive unit relative to the drive housing, wherein a pressure detecting device is arranged on the fluid-actuated rotary drive, by which the fluid pressure prevailing in the drive chambers can be detected via pressure detecting channels opening into the two drive chambers and designed separately with respect to the control fluid channel system, for enabling a pressure-regulated operating mode of the fluid-operated rotary drive, and
  wherein the rotary drive further comprises a pneumatic connection unit attached to the drive housing, which has, in an externally accessible manner, an aeration connection connectable or connected with an external pressure source and a deaeration connection connectable or connected to an external pressure sink, wherein the control valve arrangement is connected with both the aeration connection and with the deaeration connection, and
  wherein the pneumatic connection unit is equipped with a further pressure detecting device, by which the fluid pressure pending at the aeration connection and/or at the deaeration connection can be detected.

14. The rotary drive device according to claim 13, wherein the pressure detecting channels pass through a peripheral side wall of the drive housing radially outwardly bounding the drive chambers and open into the drive chambers on the inner circumferential surface of the peripheral side wall radially facing the main axis.

15. The rotary drive device according to claim 14, wherein the pressure detecting device is arranged on an outer circumferential surface of the peripheral side wall of the drive housing facing radially away from the main axis.

16. The rotary drive device according to claim 13, wherein a separate pressure detection channel opens out into each drive chamber, to which a pressure sensor of the pressure detecting device is connected.

17. The rotary drive device according to claim 16, wherein the pressure sensor is plugged from the outside into the associated pressure detection channel.

18. The rotary drive device according to claim 13, wherein the pressure detecting device is arranged on a sensor holder mounted radially outside on the drive housing.

19. A robot arm of a robot, comprising at least two arm members connected to one another by a rotary drive device which comprises a fluid-actuated rotary drive, which has a drive housing and a drive unit rotatable relative thereto about a main axis of the rotary drive by a controlled fluid application of at least one pivot piston arranged in the drive housing, whereby a drive shaft of the drive unit connected to the pivot piston projects from the drive housing at an axial front side of the drive housing with a drive section enabling a force output, and with a control valve arrangement comprising at least one electrically actuatable control valve, which is fluidically connected via a control fluid channel system to two drive chambers of the rotary drive separated from one another by the pivot piston in the drive housing, and which is designed to control the fluid pressurization of the two drive chambers for rotation and rotative positioning of the drive unit relative to the drive housing, wherein a pressure detecting device is arranged on the fluid-actuated rotary drive, by which the fluid pressure prevailing in the drive chambers can be detected via pressure detecting channels opening into the two drive chambers and designed separately with respect to the control fluid channel system, for enabling a pressure-regulated operating mode of the fluid-operated rotary drive, wherein the drive section of the drive shaft and the drive housing of the fluid-operated rotary drive each have a mounting interface to which one of the arm members of the robot arm is attached, and
  wherein the rotary drive further comprises a pneumatic connection unit attached to the drive housing, which has, in an externally accessible manner, an aeration connection connectable or connected with an external pressure source and a deaeration connection connectable or connected to an external pressure sink, wherein the control valve arrangement is connected with both the aeration connection and with the deaeration connection, and
  wherein the pneumatic connection unit is equipped with a further pressure detecting device, by which the fluid pressure pending at the aeration connection and/or at the deaeration connection can be detected.

20. A rotary drive device comprising a fluid-actuated rotary drive, which has a drive housing and a drive unit rotatable relative thereto about a main axis of the rotary drive by a controlled fluid application to at least one pivot piston arranged in the drive housing, whereby a drive shaft of the drive unit connected to the pivot piston projects from the drive housing at an axial front side of the drive housing with a drive section enabling a force output, and with a control valve arrangement comprising at least one electrically actuatable control valve, which is fluidically connected via a control fluid channel system to two drive chambers of the rotary drive separated from one another by the pivot piston in the drive housing, and which is designed to control the fluid pressurization of the two drive chambers for rotation and rotative positioning of the drive unit relative to the drive housing, wherein a pressure detecting device is arranged on the fluid-actuated rotary drive, by which the fluid pressure prevailing in the drive chambers can be detected via pressure detecting channels opening into the two drive chambers and designed separately with respect to the control fluid channel system, for enabling a pressure-regulated operating mode of the fluid-operated rotary drive, and
  wherein each of the two pressure detecting channels have an inner channel entrance, each inner channel entrance opening into a respective one of the drive chambers in such a way that the inner channel entrances lie outside of a pivoting range, which can be traversed by a wing section of the pivot piston during the pivoting movement of the pivot piston causing the rotation of the drive unit, and wherein the pivot piston is arranged in a circular contoured housing interior of the drive housing and together with a partition wall element arranged in the housing interior subdivides the housing interior in a fluid-tight manner into the two drive chambers, wherein the partition wall element acts as a stop element by interacting with the wing section of the pivot piston to specify a maximum pivot angle of the pivot piston, and wherein the inner channel entrances of the pressure detecting channels are located adjacent to the partition wall element in regions of the drive chambers which are outside of the pivoting range of the wing section defined by the maximum pivot angle of the pivot piston, and wherein the inner channel entrances of the pressure detecting channels open into a respective pressure pickup section defined between the abutment section and an inner peripheral wall of the drive housing.

\* \* \* \* \*